J. F. RUDE.
MANURE SPREADER.
APPLICATION FILED JUNE 11, 1918.

1,310,445.

Patented July 22, 1919.

WITNESS
Walter H. Troemel.

INVENTOR
John F. Rude
BY
Bradford & Doolittle
ATTORNEYS

UNITED STATES PATENT OFFICE.

JOHN F. RUDE, OF LIBERTY, INDIANA.

MANURE-SPREADER.

1,310,445.   Specification of Letters Patent.   Patented July 22, 1919.

Application filed June 11, 1918. Serial No. 239,420.

*To all whom it may concern:*

Be it known that I, JOHN F. RUDE, a citizen of the United States, residing at Liberty, Union county, and State of Indiana, have invented and discovered certain new and useful Improvements in Manure-Spreaders, of which the following is a specification.

My invention relates to manure spreaders. The object of the invention is to provide a spreader adapted to obtain a wide spreading action and an even distribution of an arch-shaped or crowned load of manure from the carrier.

With this object in view, my invention is embodied in preferable form in the construction and arrangement hereinafter described and illustrated in the accompanying drawings.

Figure 1:
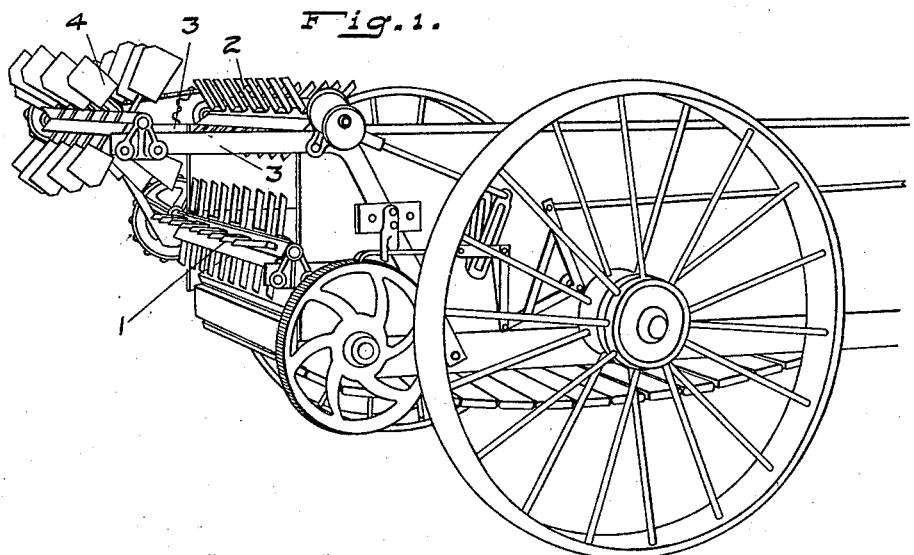
Figure 2:
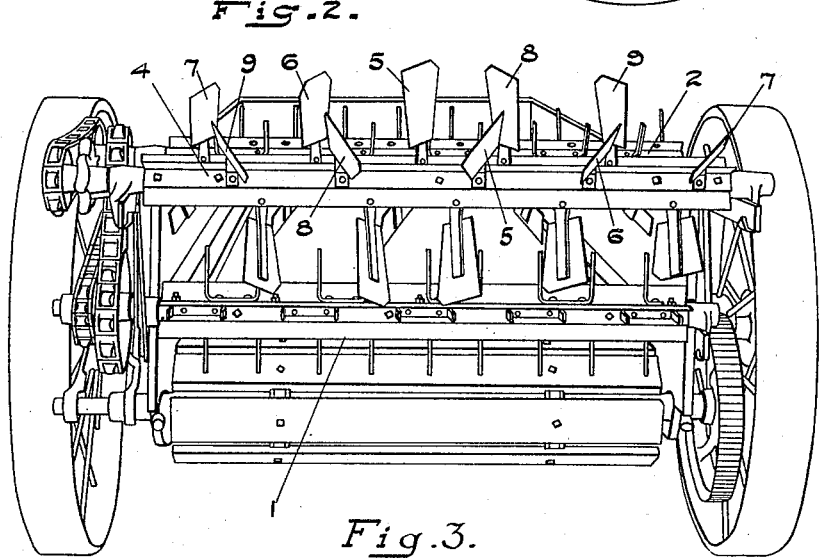
Figure 3:
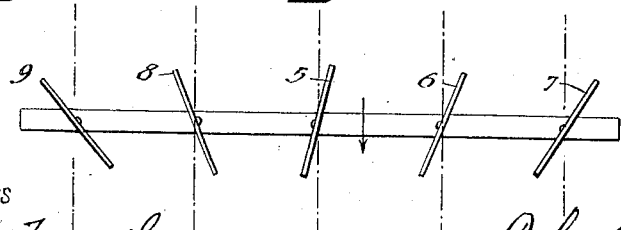

In these drawings, Figure 1 is a side view in elevation of the spreader; Fig. 2, a rear view in elevation; Fig. 3, a detail plan indicating the angles of the blades.

Referring to the drawings, the manure spreader is of the endless apron type and is provided with toothed beater means at the rear end thereof. 1 indicates a lower beater extending across the machine and adapted to engage the lower part of the load and distribute the same rearwardly of the machine. This beater is adapted to handle approximately one-third of the load carried by the spreader body, and to distribute the same over the ground directly behind the spreader body and in a path having approximately the same width as that of the machine. Mounted above the beater 1, and forward of the same, is an upper toothed beater 2 adapted to be driven at a greater speed than the lower beater and having its teeth projecting above the level of the top of the carrier body with its shaft carried substantially at said level. This upper beater is adapted to disintegrate and distribute substantially two-thirds of the load which the body is adapted to carry. The carrier is adapted to be loaded with an arch-shaped or crowned load extending above the level of the carrier body, thereby obtaining a greatly increased capacity of spreader and enabling fewer trips to be made across a field of given area as compared to the ordinary spreader which is capable of handling only a flat top load.

Mounted in rearwardly extending beams 3, to the rear of the beater 2 and with its shaft in substantially the same horizontal plane as the shaft of said beater 2 is a deflector 4, adapted to angularly deflect part of the load so as to obtain a width of spread of the manure greater than that of the body of the carrier. Spreaders designed to accomplish this end are ordinarily designated as of the "wide-spread" type.

In my invention, this deflector is adapted to effectively handle the arch-shaped load and so distribute the excess mass above the top horizontal plane of the carrier as to obtain an even distribution of the manure throughout the entire width of the path of spread. To this end the member 4 is provided with deflecting means progressively increasing in receiving and distributing capacity from each end thereof to the center whereby the deflector is rendered capable of evenly distributing the arch-shaped load. This graduated characteristic of the two series of deflecting means may be embodied in various constructions as by means of blades progressively increasing in radial extension or in width toward the center, or in both, or by otherwise obtaining a greater feeding capacity at the center relatively to the ends and points intermediate the ends and center. The greater throwing capacity of the inner part of the deflecting means, so as to insure an even feed, may also be obtained by increasing toward the center the angularity or pitch of the same. In the present embodiment of the invention this function is carried out preferably by deflector blades varying in length or radial projection, and the angularity of the plane faces of the blades is also shown as differing from the center to the ends in order to obtain a longer distance of throw from the central blades. It is clear also that the relative differences in the distributing capacity of the blades may be obtained by providing blades of different widths as compared with blades of varying lengths, and that other forms of graduated deflector means and blades may be employed.

In the drawings four rows of blades are illustrated and each row consists of two series of blades, 5, 6 and 7 denoting the central, intermediate and end blades of one series, and 8, and 9, indicating the corresponding blades of the other series, the respective blades of the two series being turned angularly toward opposite sides of the spreader so as to deflect the upper part of the load to the space outside of the width of the carrier body. It will be seen that the central blade 5 is longer than the adjacent blade 6 and the latter blade is longer than the blade 7, thus accommodating the capacity of the blades proportionately to the sloping load of manure.

The angularity or pitch of the blades in relation to the axis of the deflector increases from the ends of the deflector toward the middle thereof. In other words, the end deflectors 7 and 9 stand at a less angle to the axis of the deflector than the blades 6 and 8, while the blade 5 is at still greater angle to the axis than the blades 6 and 8. This variation in angularity is clearly indicated in Fig. 3. It will be understood of course that in the adjacent rows of blades where each row consists of five blades, three blades on one end stand in one direction and the two on the other end in the other direction. In the adjacent row the three standing in the same direction are on the same end as the two blades in the adjacent rows. This is clearly indicated in Fig. 2.

In the operation of the machine, the body of the carrier is adapted to be loaded with an arch-shaped or crowned load extending considerably above the level of the body of the carrier. As the machine is drawn along the apron will feed the load to the rear end thereof and the lower beater 1 will engage the lower part of the load of manure and disintegrate it and distribute it to the rear of the machine within the limits of the width of the body. The upper beater is adapted to handle approximately two-thirds of the load, owing to the increased body of material obtained by the arch-form of load rendered possible and such beater will disintegrate and throw the manure to the rear directly into the deflecting means carried by the member 4, substantially on a plane just above the shaft of said member. This deflecting member is driven by suitable gear mechanism and as the manure strikes the deflecting means the same will be carried angularly from the center toward the right and left sides of the machine respectively, and to a distance considerably beyond the width of the machine. Owing to the greater distributing capacity of the deflecting means as the same approach the center the increased amount of material due to the arch-shaped load will be proportionately handled relatively to the outer part of the deflecting means, and hence the manure of the entire load will be evenly and uniformly distributed over the path of spread.

It will be seen that since the deflector is located immediately to the rear of the upper beater and with its shaft in substantially the same horizontal plane thereof, the force imparted to the load by the upper beater is prevented from being lost and is directly accelerated and the manure continued in substantially the same general rearward line of direction by the added force imparted thereto by the deflector, thus fully utilizing the throwing force imparted to the load by the beater and deflector and enabling the wide spreading action to be more effectively obtained.

Having thus described my invention, what I claim is:—

1. A manure spreader provided with a beater and a deflector to the rear of the beater having greater distributing capacity at the center thereof than at the ends.

2. A manure spreader provided with a beater and a deflector to the rear of the beater having deflecting means increasing in capacity from the ends thereof to the center.

3. A manure spreader having a beater and a rotatably driven deflector, mounted to receive the material fed by the beater and having deflecting means progressively increasing in distributing capacity from each end to the center.

4. A manure spreader having a beater and a rotatably driven deflector to the rear of the beater having deflecting means increasing in size from each end to the center.

5. A manure spreader having a beater and a rotatably driven angularly deflecting member to the rear of the beater having deflecting means increasing in radial projection from the ends to the center thereof.

6. A manure spreader having a beater and a deflector to the rear of the beater having deflecting means increasing in angular pitch in relation to the axis of said deflector from the ends toward the center thereof.

7. A manure spreader having a deflector provided with deflecting means increasing in size and in angular pitch in relation to the axis of the deflector from the ends thereof toward its center.

8. A manure spreader having a rotatable deflector provided with blades having their plane faces angularly disposed to the horizontal axis of the spreader and increasing in radial length from each end to the center of the beater.

9. A manure spreader having a rotatable beater having its axis mounted at substantially the upper level of the spreader body, and a deflector directly to the rear of said beater and having deflecting means increasing in capacity from each end to the center.

10. A manure spreader having a plurality of superposed beaters each adapted to distribute a portion of the load from the spreader upon the ground and a deflector, mounted relatively to one of the beaters to receive and deflect that part of the load from that beater only.

11. A manure spreader having a pair of beaters in different horizontal planes and each adapted to rearwardly distribute a part of the load and a deflector to the rear of the upper beater and mounted to receive and angularly deflect that part of the load handled by the upper beater alone.

12. A manure spreader having a plurality of superposed distributing beaters with the upper beater operable to distribute the greater part of the load and a deflector to the rear of the beaters and mounted to receive and deflect the part of the load fed by the upper beater alone.

13. A manure spreader having a lower distributing beater and an upper distributing beater and an angularly deflecting rotatable member to the rear of the upper beater with its axis in substantially the same horizontal plane as that of the axis of said upper beater said member being provided with deflecting means increasing in capacity from each end to the center.

14. A manure spreader having a lower beater adapted to distribute directly upon the ground the smaller portion of the load, an upper beater adapted to distribute the greater portion of the load and a deflector adapted to receive the load from the upper beater alone and having deflecting means increasing in capacity from each end to the center of the deflector.

15. A manure spreader having a lower beater, an upper beater set in advance of the lower beater, and a deflector adapted to receive the load from the upper beater alone and having deflecting means increasing in capacity from each end to the center of the deflector.

In witness whereof, I have hereunto set my hand and seal at Liberty this 17th day of May, A. D. nineteen hundred and eighteen.

JOHN F. RUDE. [L. S.]

Witnesses:
W. MAIBAUGH,
M. MAIBAUGH.

Copies of this patent may be obtained for five cents each, by addressing the "Commissioner of Patents, Washington, D. C."